*Bishop & Merret,*
*Sewing Machine Caster.*

No. 113,135. Patented Mar. 28. 1871.

Witnesses
John A. Ellis
James V. White

Inventor
Thomas T. Bishop & Henry J. Merret
Per,
T. H. Alexander
Atty

UNITED STATES PATENT OFFICE.

THOMAS T. BISHOP AND HENRY J. MERRET, OF EVANSVILLE, INDIANA.

IMPROVEMENT IN SEWING-MACHINE CASTERS.

Specification forming part of Letters Patent No. 113,135, dated March 28, 1871.

*To all whom it may concern:*

Be it known that we, THOMAS T. BISHOP and HENRY J. MERRET, of Evansville, in the county of Vanderburg and State of Indiana, have invented certain new and useful Improvements in Sewing-Machine Casters; and we do hereby declare that the following is a full, clear, and exact description thereof, reference being had to the accompanying drawing, and to the letters of reference marked thereon, which form a part of this specification, in which—

Figure 1:
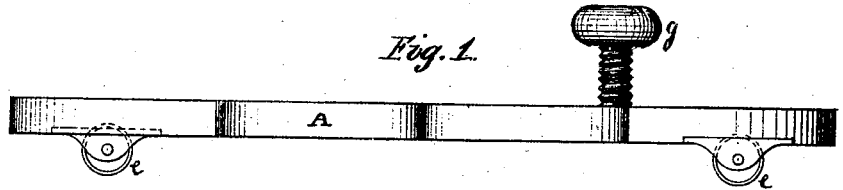
Figure 2:
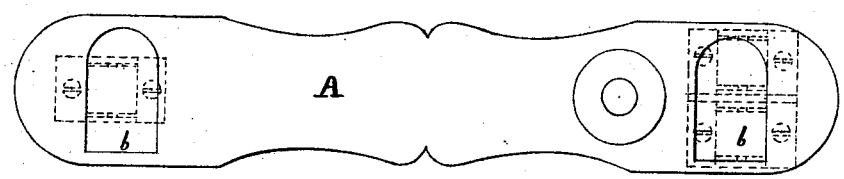

Figure 1 is a side elevation, and Fig. 2 a plan view.

The nature of our invention consists in the employment of two slats provided with casters, a set-screw, and receptacles for the feet of a sewing-machine, as and for the purpose hereinafter set forth.

To enable others skilled in the art to make and use our invention, we will now describe its construction and mode of operation.

In the annexed drawing, A represents a slat, with receptacles $b$ $b$, for the feet of the machine to rest in. $e$ $e$ are casters. We prefer to have two at one end of the slat A, as seen in Fig. 2, and a single one at the opposite end.

$g$ represents a screw passing through the slat near the end at which the pair of casters is located. This screw is provided with a knob, so that it may be easily operated.

The machine is set upon a pair of slats, constructed as above described, and may thus be easily moved without tearing or wearing out the carpet.

When it is desirable to have the machine stationary, or when in use, the screw $g$ will be turned until it relieves the weight of the machine upon the pair of casters, and by simply reversing the screw the caster will again rest upon the floor.

Having thus fully described our invention, what we claim, and desire to secure by Letters Patent, is—

The slats A, provided with casters $e$ $e$ and set-screw $g$, arranged to elevate one end of the platform, and operate substantially as and for the purpose set forth.

In testimony that we claim the foregoing as our own we affix our signatures in presence of two witnesses.

THOMAS T. BISHOP.
HENRY J. MERRET.

Witnesses:
HENRY C. VAGANT,
W. BAKER.